United States Patent [19]

Beveventano et al.

[11] Patent Number: 4,686,771
[45] Date of Patent: Aug. 18, 1987

[54] GYROCOMPASSING APPARATUS FOR STATIONARY EQUIPMENT

[75] Inventors: Thomas Beveventano, Washington Twp., Bergen County; Frank L. Rosen, Parsippany; Richard H. Wolff, Hillsdale; Raymond Bendett, Ridgewood, all of N.J.

[73] Assignee: Allied Corporation, Morris Township, Morris County, N.J.

[21] Appl. No.: 901,229

[22] Filed: Aug. 28, 1986

[51] Int. Cl.$^4$ ............................................. G01C 19/38
[52] U.S. Cl. .................................................... 33/324
[58] Field of Search .......................... 33/324, 325, 326

[56] References Cited

U.S. PATENT DOCUMENTS

| | | | |
|---|---|---|---|
| 2,677,194 | 5/1954 | Bishop | 33/226 |
| 2,693,928 | 11/1954 | Bishop et al. | 33/324 |
| 2,700,829 | 2/1955 | Statsinger | 33/324 |
| 3,292,269 | 12/1966 | Brugger | 33/226 |
| 3,394,596 | 7/1968 | Wehde et al. | 74/5 |
| 3,813,788 | 6/1974 | Johnston | 33/321 |
| 4,158,261 | 6/1979 | Auer | 33/324 |
| 4,443,952 | 4/1984 | Schulien et al. | 33/324 |
| 4,458,426 | 7/1984 | O'Connor et al. | 33/325 |
| 4,461,089 | 7/1984 | Krogmann | 33/324 |

FOREIGN PATENT DOCUMENTS 1180698  9/1985  U.S.S.R. .................. 33/324

Primary Examiner—Richard R. Stearns
Attorney, Agent, or Firm—Howard G. Massung; Stanley N. Protigal; Anthony F. Cuoco

[57] ABSTRACT

Gyrocompassing apparatus for stationary equipment is disclosed which provides heading and two-axis tilt information while utilizing a minimum complement of relatively low cost components. The apparatus features a single degree of freedom gyroscope mounted to a mechanical levelling and indexing arrangement for implementing a gyrocompassing routine. Tilt information is provided with relatively high accuracy via a two-axis pendulum mechanization. A microprocessor with associated peripherals provides required control, compensation and computational functions.

16 Claims, 4 Drawing Figures

GYROCOMPASSING APPARATUS FOR STATIONARY EQUIPMENT

BACKGROUND OF THE INVENTION

A need exists for achieving low cost north seeking or gyrocompassing for stationary equipment such as howitzers, radar antenna pedestals and other like equipment without compromising accuracy. The present invention achieves this objective by utilizing one single axis gyroscope (gyro) and by eliminating the need for costly inertial system components such as accelerometers, gimbal torquers, slip-rings, gimbal servos and heating elements with associated temperature control electronics. The fact that the disclosed apparatus is to be used in conjunction with stationary rather than mobile equipment permits the aforenoted design simplifications for attaining both relatively low cost and high accuracy for the purposes intended.

In accordance with the invention a single package with one interface connector and including a gyro/pendulum assembly and an associated electronics assembly is provided. A relatively temperature insensitive gyro in conjunction with the mechanization of the disclosed apparatus negates the need for temperature compensation. Compensation for motion of the stationary equipment as can occur in a vibrational or settling environment can be implemented.

SUMMARY OF THE INVENTION

This invention contemplates gryocompassing apparatus for stationary equipment and which apparatus is included in a self-contained attitude reference system. The only input required is system power which initiates operation of the apparatus to provide heading with respect to true north and tilt in the form of pitch and roll attitude with respect to local or geodetic level. These parameters are provided with relatively high accuracy and within a relatively short time after power is applied.

Significantly, the apparatus does not require pre-orientation or a latitude input to perform the gyrocompassing function. In fact, the apparatus can determine and transmit latitude to provide built in test (BIT) indication of its proper operation. Compensation for base motion, i.e. motion of the stationary equipment, can be implemented to insure a required gyrocompassing accuracy in the presence of settling, vibrational or other like disturbances.

The main elements of the apparatus are a gyro/pendulum assembly and an electronics assembly. A microprocessor with associated peripherals is included in the electronics assembly and provides required control, compensation, and computational functions. Unregulated DC power is the only input required. A serial data link is provided for communicating with an external terminal.

The gyrocompassing function requires approximate levelling of the sensitive axis of the gyro followed by accurate sequencing or indexing of this sensitive axis to preset headings. These functions are performed automatically by the disclosed apparatus.

The gyro is pendulously suspended from pitch and roll gimbals to achieve the aforenoted levelling. Pitch and roll gimbal brakes are released to unlock the pendulous suspension in preparation for the aforenoted gyrocompassing, and mechanical damping elements are used on each gimbal to aid in the levelling process.

Coarse levelling of the sensitive axis of the gyro so that the gyro output axis is substantially vertical minimizes drift errors due to gyro mass unbalance and thereby eliminates the need for temperature compensation to accommodate these errors. After an allocated interval for levelling has elapsed the pendulous suspension is locked via the aforenoted brakes to strapdown the gyro in preparation for gyrocompassing.

Residual tilt of the gyro due to friction on the gimbal axes is mounted by either one or two level sensors mounted on the pendulous suspension. The residual tilt of the pendulum is appropriately transformed and summed with information from pitch and roll axis resolvers to obtain relatively accurate pitch and roll attitude of the apparatus case or frame with respect to local or geodetic level.

In order to measure earth's rate, the gyro is configured as a rate sensor by utilizing rate capture electronics. Earth rate measurements at three predetermined headings, 120 degrees apart, are made. The initial heading is determined by a stop arrangement associated with the azimuth indexing axis of the apparatus. Indexing to the two other heading positions is accomplished via a stepper motor arrangement.

When the three earth's rate measurements have been made, true heading is computed and transmitted along with pitch and roll attitude via a serial interface data link, after which the apparatus is returned to the first heading position and system power can be turned off.

DETAILED DESCRIPTION OF THE INVENTION

Figure 1:
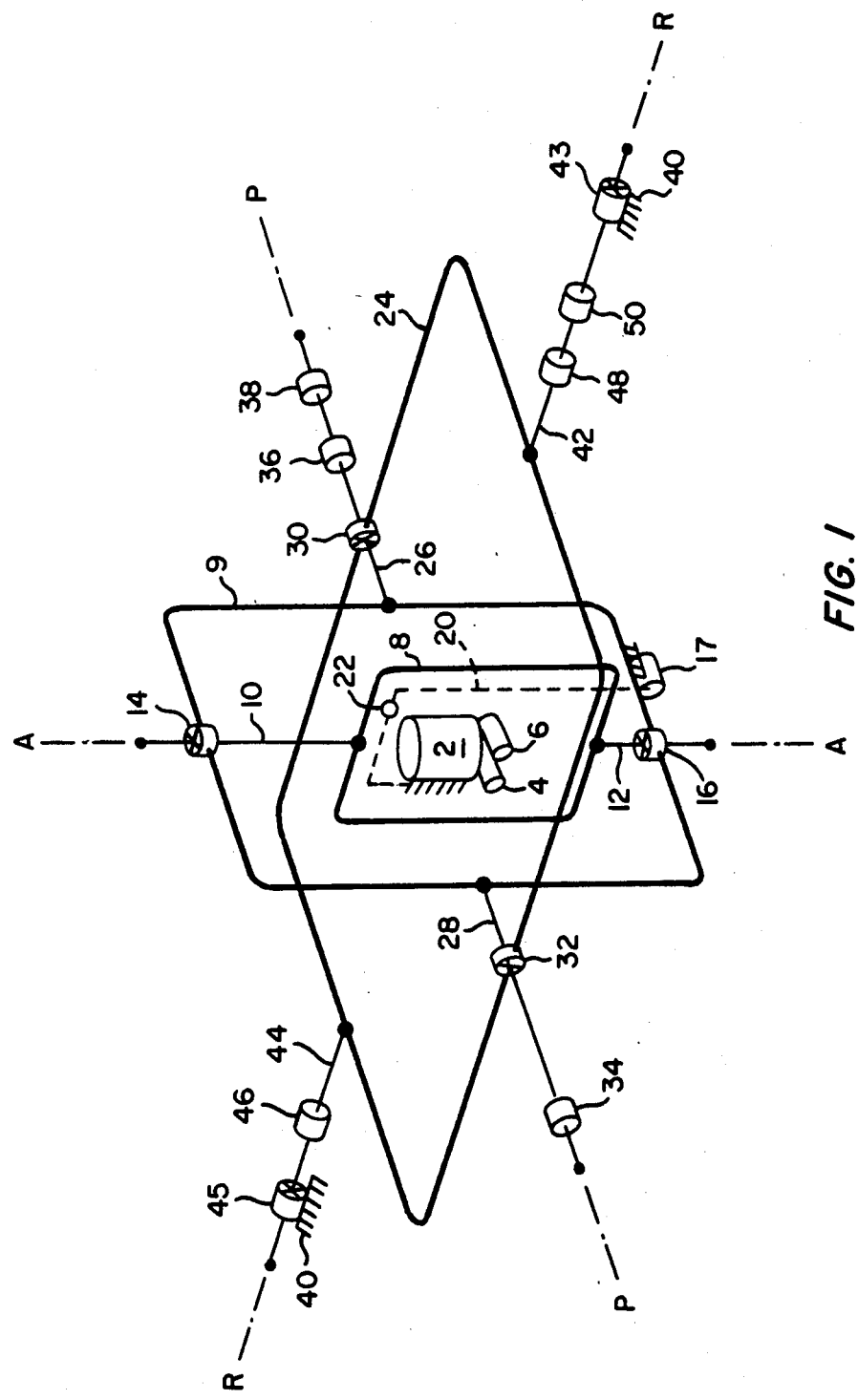
FIG. 1 is a diagrammatic representation illustrating the mechanical configuration of the invention.

With reference first to FIG. 1, a gyro is designated generally by the numeral 2. Gyro 2 which is a conventional single degree of freedom gyro, supports a gyro input axis (IA) level sensor 4 and a gyro spin axis (SA) level sensor 6. Level sensors 4 and 6 may be conventional electrolytic switches, or, if application requirements dictate, the level sensors can be accelerometers as will now be readily understood by those skilled in the art. A single level sensor may be arranged for the intended purposes as will be hereinafter described.

For the purposes of the present invention it is not necessary to describe gyro 2 in detail. Suffice it to say that the gyro has its single degree of freedom output axis (OA) aligned to a vertical axis and has a wheel or rotor having a horizontal spin axis transverse to the vertical axis. As is well understood in the gyro art, rotation of the gyro case about a horizontal input (sensitive) axis applies a torque and hence displacement about the vertical axis, i.e. the gyro output axis, at which an output signal is provided. The input axis of gyro 2 is transverse to both the spin and output axes.

Gyro 2 is mounted to an azimuth gimbal 8. Azimuth gimbal 8 is rotatably mounted to a pitch gimbal 9 via pivot shafts 10 and 12 and bearings 14 and 16, respectively, for rotation or indexing about an azimuth axis A—A.

The aforenoted indexing is accomplished via a stepper motor 17 suitably mounted to pitch gimbal 9. Motor 17 is connected by a suitable gearing arrangement 20 to gimbal 8. Gearing arrangement 20 has a stop means 22 in association therewith. Stepper motor 17 receives electrical pluses for indexing azimuth gimbal 8 about axis A—A as will hereinafter be more fully described. Stop means 22 establishes a starting point for the aforenoted indexing as will also be hereinafter more fully described.

Pitch gimbal 9 is rotatably mounted to a roll gimbal 24 via pivot shafts 26 and 28 and bearings 30 and 32, respectively, for rotation about a pitch axis P—P. Pivot shaft 28 carries pitch axis resolver 34 and pivot shaft 26 carries pitch axis brake means 36 and pitch axis damping means 38.

Roll gimbal 24 is rotatably mounted to a case or frame 40 via pivot shafts 42 and 44 and bearings 43 and 45, respectively, for rotation about a roll axis R—R. Pivot shaft 44 carries a roll axis resolver 46 and pivot shaft 42 carries roll axis brake means 48 and roll axis damping means 50. Case 40 is mounted to the aforenoted stationary equipment, hereinafter also referred to as a base.

With continued reference to FIG. 1, it will be noted that the arrangement is such that the center of gravity of azimuth gimbal 8 which supports gyro 2 is below the common plane of pitch axis P—P and roll axis R—R. Azimuth gimbal 8 is thus pendulously supported by the described configuration of pitch gimbal 9 and roll gimbal 24, the same being a distinct feature of the invention.

In connection with brake means 36 and 48 it is noted that said means includes conventional electro-magnetic brakes which allow the respective pitch and roll gimbals 9 and 24 to be locked in any position about their axes and thereafter unlocked.

In connection with damping means 38 and 50 it is noted that said means are likewise conventional devices using a silicon liquid for damping oscillations to aid the aforenoted levelling. Alternatively, the damping means may be likewise conventional geared drag cups in a magnetic field.

Figure 2:
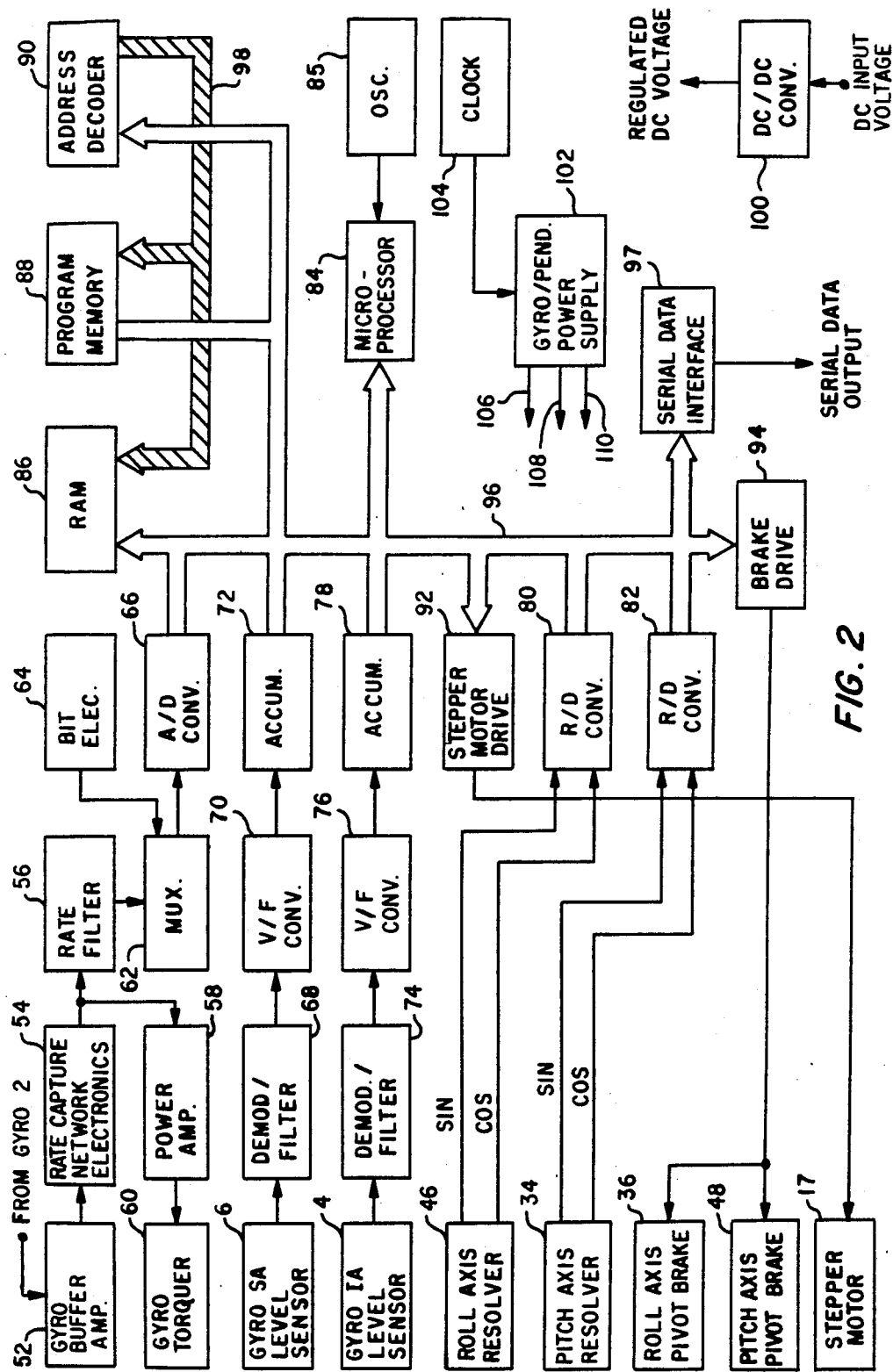
FIG. 2 is a block diagram illustrating the electrical configuration of the invention.

With reference now to FIG. 2, gyro 2 provides an output signal which is applied to a gyro buffer amplifier 52 and therefrom to rate capture network electronics 54. The signal from rate capture network electronics 54 is applied to a rate filter 56 and to a power amplifier 58. Power amplifier 58 provides a signal for energizing a gyro torquer 60.

The signal from rate filter 56 which is a measure of earth's rate is applied to a multiplexer (MUX) 62 as is a signal from built-in test (BIT) electronics 64. The output from multiplexer 62 is applied to an analog to digital converter 66.

Gyro spin axis level sensor 6 provides a signal which is applied to a demodulator/filter 68 and therefrom to a voltage to frequency converter 70. The output from voltage to frequency converter 70 is applied to an accumulator 72.

Gyro input axis level sensor 4 provides a signal which is applied to a demodulator/filter 74 and therefrom to a voltage to frequency converter 76. The output from voltage to frequency converter 76 is applied to an accumulator 78.

Roll axis resolver 46 provides signals corresponding to the sine and cosine of the displacement of roll gimbal 24 about roll axis R—R. These signals are applied to a resolver to digital converter 80. Pitch axis resolver 34 provides signals corresponding to the sine and cosine of the angle of displacement of pitch gimbal 9 about pitch axis P—P. These signals are applied to a resolver to digital converter 82.

A microprocessor is designated by the numeral 84 and is driven by an oscillator 85. Microprocessor 84 which provides all required control, computational and compensation functions includes peripherals such as a random access memory (RAM) 86, a program memory 88 and an address decoder 90. Communication between microprocessor 84, RAM 86, program memory 88, address decoder 90, analog to digital converter 66, accumulators 72 and 78, resolver to digital converters 80 and 82, a stepper motor drive 92 and a brake drive 94 is accomplished via a data bus 96. Communication between address decoder 90, program memory 88 and RAM 86 is accomplished via an address bus 98.

Stepper motor drive 92 applies drive pulses to stepper motor 17 for purposes to be hereinafter described. Brake drive 94 provides an output for actuating pitch axis pivot brake 36 and roll axis pivot brake 48, also for purposes to be hereinafter described.

Data bus 96 communicates with a serial data interface 97 which provides a serial data output for application to a utilizing terminal as will now be understood. An unregulated DC input voltage is applied to a DC to DC converter 100, the output of which is a regulated DC voltage for the apparatus herein described. A gyro/pendulum power supply 102 is driven by a clock 104 and provides an excitation output at output conductor 106 for exciting level sensors 4 and 6 and the signal generator (not otherwise shown) of gyro 2, an excitation output at output conductor 108 for exciting resolvers 38 and 60, and an excitation output at output conductor 110 for exciting the earlier mentioned wheel or rotor of gyro 2, as the case may be.

OPERATION OF THE INVENTION

In accordance with the aforegoing description of the invention it will be understood that gyro 2 mounted to azimuth gimbal 8 is suspended in pendulous fashion from pitch and roll gimbals 9 and 24, respectively. When it is desired to use the apparatus for its intended purposes, pitch and roll axis pivot brakes 36 and 48 are released via brake drive 94 to unlock the pendulous arrangement for levelling the input or sensitive axis of gyro 2 in preparation for performing the gyrocompassing routine. Damping means 38 and 50 aid the levelling process by damping pendulous displacements about the pitch and roll axes, respectively.

Coarse levelling of the gyro sensitive axis so that the gyro output axis is approximately vertical is first accomplished and minimizes gyro mass unbalance drifts, and thereby eliminates the need for temperature compensation as would otherwise be the case. After a predetermined levelling interval has elapsed, brakes 36 and 48 are locked via brake drive 94 to strap-down the gyro in preparation for the gyrocompassing routine.

In order to measure the earth's rate components required for gyrocompassing, gyro 2 is configured as a rate sensor via rate capture electronics 54, power amplifier 58 and rate filter 56 (FIG. 2). Earth's rate measurements are taken at three predetermined headings, which are 120 degrees apart. The initial predetermined heading is determined by stop arrangement 22 (FIG. 1), which restricts rotation of azimuth gimbal 8 about aximuth axis A—A. Indexing about azimuth axis A—A to the other two gyrocompassing headings is accomplished by stepper motor 17 driven by stepper motor drive 92 via gearing arrangement 20 (FIG. 1). In this connection it is noted that accurate positioning to the aforenoted headings is obtained by transmitting a controlled number of pulses from stepper motor drive 92, as determined by microprocessor 84, to the steppor motor which provides precise angular stepping.

At "power on", azimuth gimbal 9 is already set at the first gyrocompassing heading via stop arrangement 22. When initialization which includes the aforenoted levelling is complete earth's rate measurements are made at this first heading. Gimbal 9 is then sequentially indexed to the second and third headings to obtain the other required earth's rate measurements. After earth's rate measurements have been taken at the three headings, true heading is computed via microprocessor 84 and transmitted via serial data interface 97. Gimbal 9 is then indexed to the first heading and power can be turned off. With the hereinafter described gyrocompassing analysis in mind, programming of microprocessor 84 for the intended computations is well within the scope of a programmer skilled in the art.

Level sensors 4 and 6 detect any residual off-level condition of the described pendulous arrangement for utilization in the aforenoted gyrocompassing to insure accurate computation of true heading by microprocessor 84. The off-level measurements are also used to compensate for gyro mass unbalance drifts as will now be understood.

Resolvers 34 and 46 measure the pitch and roll angles of the respective pitch roll gimbals 9 and 24 with respect to case or frame 40 of the apparatus. Pitch and roll tilt of the case or frame with respect to local level is obtained by appropriate summing of information from the resolvers and coordinate transformed information from level sensors 4 and 6. Coordinate transformation of the level sensor information is possible because the orientation of the level sensors with respect to the case or frame of the apparatus is known by design. As shown in FIG. 2, rate and tilt information is converted from analog to digital form for processing by microprocessor 84.

A single level sensor, i.e. gyro spin axis level sensor 4 can be used instead of the two level sensors 4 and 6. In this connection it is noted that level sensor measurements taken at the three predetermined headings completely define the plane in which gyro 2 rotates. Since the location of the gyro input and spin axes is always known in this plane, trignometric manipulation can be readily performed after readings at the three headings are taken to compensate for any residual off-level tilts in the gyrocompassing equation to be hereinafter developed, and also to compensate for the absolute gyro input axis and spin axis mass unbalance drifts which are caused by the off-level condition.

Since the orientation of the level sensor is always known by design with respect to the case or frame of the apparatus, a coordinate transformation of the three level sensor readings can be performed to determine the off-level tilts of the pitch and roll gimbals. This gimbal tilt information can then be appropriately summed with the pitch and roll resolver readings to determine the pitch and roll attitude of the apparatus case.

GYROCOMPASSING ANALYSIS

In order to determine the angle of the described apparatus with respect to north, a three-step gyrocompass routine has been mechanized which yields an estimate of true heading. This routine was selected because it does not require a prior knowledge of latitude, initial heading, gyro absolute bias, or gyro torquer scale factor.

Figure 3:
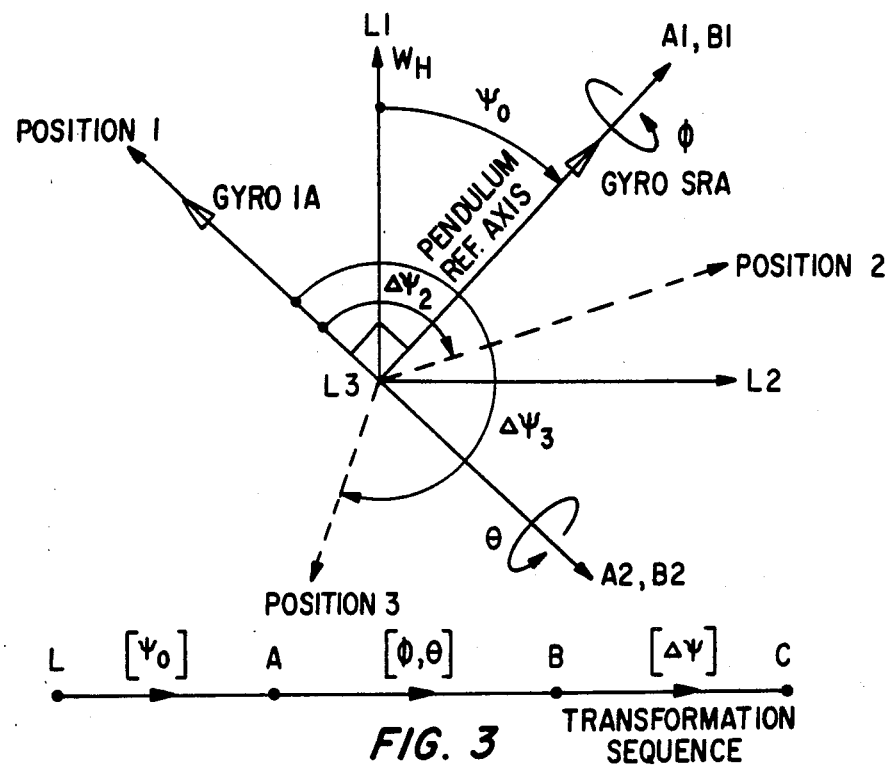
FIG. 3 is a vector diagram illustrating a coordinate reference frame definition and transformation sequence in accordance with the invention.

FIG. 3 defines the key coordinate reference frames involved in the aforenoted routine and shows the transformation from L space (local vertical inertial) to B space (pendulum).

The transformation from L to B space is given as follows:

$$\underline{B} = \begin{bmatrix} C\Theta & 0 & -S\Theta \\ 0 & 1 & 0 \\ S\Theta & 0 & C\Theta \end{bmatrix} \begin{bmatrix} 1 & 0 & 0 \\ 0 & C\phi & S\phi \\ 0 & -S\phi & C\phi \end{bmatrix} \begin{bmatrix} C\psi_o & S\psi_o & 0 \\ -S\psi_o & C\psi_o & 0 \\ 0 & 0 & 1 \end{bmatrix} \underline{L} \quad (1)$$

Where
C=Cosine
S=Sine
L Space=Local Vertical Inertial: North, East, Down,
B Space=Pendulum, $\psi_o$, $\phi$, $\theta$ from L space,
A Space=B-Space, Untilted,
$\psi_o$=Azimuth of frame 40 (FIG. 1),
$\phi,\theta$=Roll, pitch pendulum off-level tilts,
$\Delta\psi_2, \Delta\psi_3$=120°, 240° from $-B_2$,
$W_H$=Horizontal component of WE, WE Cos $\lambda$,
$W_E$=Earth's sidereal rate,
$\lambda$=Geodetic latitude.

The roll and pitch pendulum offset angles shall be less than 1 degree. This simplifies equation (1) to the following:

$$\underline{B} = \begin{bmatrix} C\psi_o & S\psi_o & -\Theta \\ -S\psi_o & C\psi_o & \phi \\ \Theta C\psi_o + \phi S\psi_o & \Theta S\psi_o - \phi C\psi_o & 1 \end{bmatrix} \underline{L} \quad (2)$$

When the transformation of the indexing angle $\Delta\psi$ is added, $$\underline{C} = \begin{bmatrix} C\Delta\psi & S\Delta\psi & 0 \\ -S\Delta\psi & C\Delta\psi & 0 \\ 0 & 0 & 1 \end{bmatrix} [B^T L] \underline{L} \quad (3)$$

where $_BT_L$=transformation from L to B space. From FIG. 3 it can be seen that the $-C_2$ component of C space is along the input axis (IA) of gyro 2 for each index position. With earth's sidereal rate ($W_E$) as an input vector in L space, $$\underline{C} = [C^T B][B^T L] \begin{bmatrix} W_H \\ 0 \\ W_V \end{bmatrix}_L, \quad (4)$$

where $W_H$, $W_V$=horizontal and vertical components of $W_E$
$W_H = W_E \cos \lambda$
$W_V = -W_E \sin \lambda$
$\lambda$=latitude, $$\text{and } C^T B = \begin{bmatrix} 1 & 0 & 0 \\ 0 & 1 & 0 \\ 0 & 0 & 1 \end{bmatrix}_1, \begin{bmatrix} -\frac{1}{2} & \frac{\sqrt{3}}{2} & 0 \\ -\frac{\sqrt{3}}{2} & -\frac{1}{2} & 0 \\ 0 & 0 & 1 \end{bmatrix}_2,$$

$$\begin{bmatrix} -\frac{1}{2} & -\frac{\sqrt{3}}{2} & 0 \\ +\frac{\sqrt{3}}{2} & -\frac{1}{2} & 0 \\ 0 & 0 & 1 \end{bmatrix}_3,$$

for the three index positions 1, 2 and 3, respectively.

An indication of the angular rate sensed by gyro 2 at the three index positions is obtained by taking the $-C_2$ component of C space: Then, $$R_1 = W_E[(S\psi_0)C\lambda - (\phi)S\lambda] + B \tag{5}$$

$$R_2 = \frac{W_E}{2}[(\sqrt{3}\,C\psi_0 - S\psi_0)C\lambda + (-\sqrt{3}\,\Theta + \phi)S\lambda] + B$$

$$R_3 = \frac{W_E}{2}[(-\sqrt{3}\,C\psi_0 - S\psi_0)C\lambda + (\sqrt{3}\,\Theta + \phi)S\lambda] + B,$$

Where $R_1, R_2, R_3$ = angular rate readings from gyro 2 at index positions 1, 2, 3, with B = gyro bias.

When the three equations (5) are added, everything cancels except the bias term. Hence:

$$R_1 + R_2 + R_3 = 3B \tag{6}$$

$$B = \frac{R_1 + R_2 + R_3}{3}$$

From equation (5) modified hardware outputs $P_1$, $P_2$, and $P_3$ are established as follows:

$$P_1 = \frac{2(R_1 - B)}{W_E} \tag{7}$$

$$P_2 = \frac{2(R_2 - B)}{W_E}$$

$$P_3 = \frac{2(R_3 - B)}{W_E}$$

These modified hardware outputs are fixed in magnitude throughout an iterative procedure. The following equations can be solved for an initial estimate of $\psi_0$ and $\lambda$, assuming $\theta$ and $\phi$ are zero.

$$P_1 = 2(\sin\psi_0)\cos\lambda - (2\phi)\sin\lambda \tag{8}$$

$$P_2 = (\sqrt{3}\,\cos\psi_0 - \sin\psi_0)\cos\lambda + (-\sqrt{3}\,\Theta + \phi)\sin\lambda$$

$$P_3 = (-\sqrt{3}\,\cos\psi_0 - \sin\psi_0)\cos\lambda + (\sqrt{3}\,\Theta + \phi)\sin\lambda$$

This leads to the following initial estimate of $\psi_0$ and $\lambda$:

$$\psi_0 \text{ ARCTAN}\left(\frac{\sqrt{3}\,P_1}{P_3 - P_2}\right)$$

$$\lambda = \text{ARCCOS}\left(\frac{P_1}{2\sin\psi_0}\right)$$

These values of $\psi_0$ and $\lambda$ are inserted into the first two equations of (8). The evaluated $P_1$ and $P_2$ expressions are redesignated $Q_1$ and $Q_2$. The new $Q_1$ and $Q_2$ expressions are then artificially perturbed by small changes $\psi_0$ and $\lambda$ to generate numerical values for the following Jacobian:

$$\begin{bmatrix} \frac{\partial Q_1}{\partial \psi_0} & \frac{\partial Q_1}{\partial \lambda} \\ \frac{\partial Q_2}{\partial \psi} & \frac{\partial Q_2}{\partial \lambda} \end{bmatrix} \tag{10}$$

$\Delta Q_1$ and $\Delta Q_2$ are defined by comparison with the original $P_1$ and $P_2$:

$$\Delta Q_1 = P_1 - Q_1$$

$$\Delta Q_2 = P_2 - Q_2$$

Equation (11) is now solved for $\Delta\psi_0$ and $\Delta\lambda$, which are used to generate new estimates of $\psi_0$ and $\lambda$ $$\Delta\psi_o \frac{\partial Q_1}{\partial \psi_o} + \Delta\lambda \frac{\partial Q_1}{\partial \lambda} = \Delta Q_1 \tag{11}$$

$$\Delta\psi_o \frac{\partial Q_2}{\partial \psi_o} + \Delta\lambda \frac{\partial Q_2}{\partial \lambda} = \Delta Q_2$$

$$\psi_0 = \psi_0 + \Delta\psi_0 \tag{12}$$

$$\lambda = \lambda + \Delta\lambda$$

Equations (9) thru (12) are repeated until the difference in successive estimates of both $\psi_0$ and $\lambda$ are less than 0.01°. An example of convergence to within 0.01° in less than 5 iterations is shown for the test case of $\psi_0 = 135°$ and $\lambda = 30°$ in the following tabulation:

|   | CORRECT VALUES | |
|---|---|---|
|   | 0.135000E+03 | 0.300000E+02 |
|   | INITIAL ESTIMATE | |
|   | 0.134508E+03 | 0.298495E+02 |
| 1 | 0.134938E+03 | 0.300092E+02 |
| 2 | 0.134963E+03 | 0.299979E+02 |
| 3 | 0.134986E+03 | 0.299976E+02 |
| 4 | 0.134996E+03 | 0.299991E+02 |
| 5 | 0.134999E+03 | 0.300001E+02 |
| 6 | 0.135000E+03 | 0.300000E+02 |
| 7 | 0.135000E+03 | 0.300000E+02 |
| 8 | 0.135000E+03 | 0.300000E+02 |
| 9 | 0.135000E+03 | 0.300000E+02 |

BASE MOTION COMPENSATION

Figure 4:
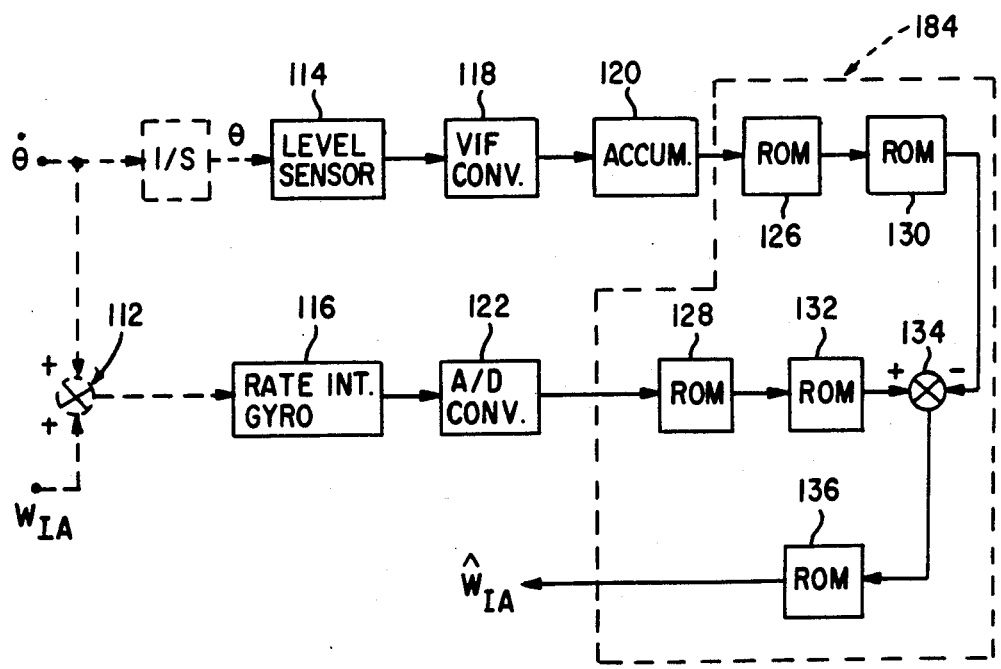
FIG. 4 is a block diagram illustrating means for separating base motion from earth's rate in accordance with the invention.

As heretofore noted, compensation for base motion can be implemented to insure a required accuracy in the presence of settling, vibrational or other like disturbances. An arrangement for accomplishing this purpose is shown in FIG. 4.

Base motion rate ($\dot{\theta}$) and earth's rate ($W_{IA}$) are sensed by gyro 2 and shown schematically added at 112. Base motion rate is physically integrated (1/s) and the resultant tilt angle is sensed by a level sensor means 114 which is level sensor 6 (FIGS. 1 and 2) which senses motion about the input axis IA of gyro 2. The addition of base motion rate and earth's rate is sensed by a rate integrating gyro means 116 implemented via rate capture electronics 54, power amplifier 58 and rate filter 56 (FIG. 2).

The output of level sensor means 114 is applied to a voltage to frequency converter means 118 and therefrom to an accumulator means 120. In the arrangement shown voltage to frequency converter means 118 is voltage to frequency converter 70, shown in FIG. 2 and accumulator means 120 is accumulator 72 likewise shown in FIG. 2.

The output of rate integrating gyro 116 is applied to an analog to digital converter means 122 which may be analog to digital converter 66 shown in FIG. 2.

Microprocessor 84 (FIG. 2) includes a read only memory (ROM) 126 which is a compensation filter for filtering the output from accumulator means 120, and includes a ROM 128 which is a compensation filter for filtering the output from analog to digital converter means 122.

Microprocessor 84 further includes a ROM 130 which is a differentiator for differentiating the output from ROM 126 and a ROM 132 for performing a trapezoidal integration on the output from ROM 128.

The outputs from ROM's 130 and 132 are algebraically subtracted at 134 and the subtracted output is applied to a ROM 136 which contains a least squares algorithm for providing an estimation of Earth's rate ($\hat{W}_{IA}$), and which estimation is used in the gyrocompassing routine earlier discussed.

It will be understood that with the arrangement shown in FIG. 4, level sensor outputs are passed through a voltage to frequency converter, accumulated and passed through an algorithm to find average tilt angles.

It is noted that earth's rate is not sensed by the level sensor. The rate integrating gyro configuration senses tilt rate plus a component of earth's rate. The rate integrating gyro output is passed through an analog to digital converter to provide a digital value of base motion rate plus earth's rate. This value is integrated and subjected to the aforenoted least squares algorithm to recover an estimation of $W_{IA}$ which is used in the gyrocompassing computation heretofore described.

With the aforenoted description in mind, reference is made to the claims appended hereto for a definition of the scope of the invention.

What is claimed is:

1. Gyrocompassing apparatus for stationary equipment, characterized by:
   a case supported by the stationary equipment;
   a first gimbal rotatably supported by the case for rotation about a first axis;
   a second gimbal rotatably supported by the first gimbal for rotation about a second axis;
   the first and second axes being transverse each to the other and being in a common plane;
   a third gimbal rotatably supported by the second gimbal for rotation about a third axis;
   gyro means mounted to the third gimbal;
   the center of gravity of the third gimbal being displaced with respect to the common plane of the first and second axes, whereby said gimbal and the gyro means mounted thereto are in pendulous arrangement relative to the first and second gimbals;
   means arranged with the first and second gimbals and operable for locking the gimbals to prevent rotation thereof about their respective axes and for unlocking said gimbals to permit said rotation;
   said gimbals being initially locked and then unlocked for a predetermined interval during which the sensitive axis of the pendulous arrangement is levelled, and thereafter locked to strap-down the gyro means with respect to the first and second axes;
   means for sequentially rotating the third gimbal about the third axis to a plurality of headings with respect to an initial heading, whereby the gyro means mounted to the third gimbal senses earth's rate at all of said headings and provides corresponding signals;
   means arranged with the gyro means for sensing residual tilts of the first and second gimbals from geodetic level and for providing corresponding signals;
   means arranged with the first and second gimbals for sensing the angles of rotation of said gimbals about the respective first and second axes relative to the pendulous arrangement and for providing corresponding signals; and
   means connected to the gyro means, the residual tilt signal means and the gimbal angle of rotation signal means and responsive to the signals therefrom for providing signals commensurate with the heading of the stationary equipment with respect to north, and with the attitude of the case with respect to geodetic level.

2. Apparatus as described by claim 1 including means for compensating for environmental motion of the stationary equipment, characterized by:
   the gyro means sensing stationary equipment motion rate and earth's rate, with stationary equipment motion rate being physically integrated for providing a resultant stationary equipment tilt angle, and stationary equipment motion rate and earth's rate being physically combined to provide a combined rate;
   means for sensing the tilt angle and for providing a corresponding signal;
   means for sensing the combined rate and for providing a corresponding signal;
   means for filtering the tilt angle signal;
   means for filtering the combined rate signal;
   means for differentiating the filtered tilt angle signal;
   means for integrating the filtered combined rate signal;
   means for combining the differentiated filtered tilt angle signal and the integrated filtered combined rate signal to provide a combined signal;
   means for affecting the combined signal in accordance with the theory of least squares and for providing a signal commensurate with an estimation of earth's rate; and
   the means for providing signals commensurate with the heading of the stationary equipment with respect to north, and with the attitude of the case with respect to geodetic level being connected to the compensating means and responsive to the estimated earth's rate signal so that the heading signal is compensated for the enviromental motion of the stationary equipment.

3. Apparatus as described by claim 2, further characterized by:
stationary equipment motion rate and earth's rate being physically added; and
the differentiated filtered tilt angle signal and the integrated filtered combined rate signal being subtracted.

4. Apparatus as described by claim 1, further characterized by:
the first axis being a roll axis;
the second axis being a pitch axis; and
the third axis being an azimuth axis.

5. Apparatus as described by claim 1, wherein the means arranged with the first and second gimbals and operable for locking and unlocking said gimbals is characterized by:
first braking means arranged with the first gimbal;
second braking means arranged with the second gimbal;
means connected to the first and second braking means for actuating said first and second braking means; and
means for controlling the actuating means to actuate said first and second braking means for unlocking the respective initially locked gimbals for the predetermined interval, and thereafter locking said respective gimbals.

6. Apparatus as described by claim 1, wherein the means for sequentially rotating the third gimbal about the third axis to a plurality of headings with respect to an initial heading is characterized by:
motor means supported by the second gimbal;
gearing means coupling the motor means to the third gimbal;
means for providing pulses for driving the motor means; and
the motor means being responsive to said pulses for sequentially rotating the third gimbal.

7. Apparatus as described by claim 6, further characterized by:
stop means associated with the gearing means for establishing the initial heading.

8. Apparatus as described by claim 1, further characterized by:
the means for sequentially rotating the third gimbal about the third axis to a plurality of headings with respect to an initial heading sequentially rotates the third gimbal to two headings, each 120 degrees apart.

9. Apparatus as described by claim 1, further characterized by:
means for damping the rotation of the first and second gimbals about their respective axes when said gimbals are unlocked.

10. Apparatus as described by claim 9, wherein the damping means is characterized by:
first damping means associated with the first gimbal; and
second damping means associated with the second gimbal.

11. Apparatus as described by claim 1, wherein the means arranged with the gyro means for sensing residual tilts of first and second gimbals from geodetic level and for providing corresponding signals is characterized by:
a first level sensor supported by the gyro means along the spin axis thereof;
a second level sensor supported by the gyro means along the input axis thereof;
the first level sensor sensing the residual tilt of the first gimbal and providing a corresponding signal;
the second level sensor sensing the residual tilt of the second gimbal and providing a corresponding signal;
the first and second level sensors sensing the residual tilt of the pendulous arrangement and providing a corresponding signal; and
means responsive to the first gimbal, the second gimbal and the pendulous arrangement tilt signals for affecting a coordinated transformation of said signals and for providing transformed signals corresponding to the residual tilts of the first and second gimbal from geodetic level.

12. Apparatus as described by claim 11, further characterized by:
the means arranged with the first and second gimbals for sensing the angle of rotation of said gimbals about the respective first and second axes includes a first revolver for sensing the angle of rotation of the first gimbal about the first axis and for providing signals corresponding to the sine and cosine of said angle, and a second resolver for sensing the angle of rotation of the second gimbal about the second axis and for providing signals corresponding to the sine and cosine of said angle; and
means for combining the transformed signals and signals from the first and second resolvers, and for providing a combined signal corresponding to the attitude of the case with respect to geodetic level.

13. Apparatus as described by claim 1, wherein the means arranged with the first and second gimbals for sensing the angle of rotation of said gimbals about the respective first and second axes is characterized by:
a first resolver for sensing the angle of rotation of the first gimbal about the first axis and for providing signals corresponding to the sine and cosine of said angle; and
a second resolver for sensing the angle of rotation of the second gimbal about the second axis and for providing signals corresponding to the sine and cosine of said angle.

14. Gyrocompassing apparatus for stationary equipment, characterized by:
a first gimbal;
gyro means mounted to the first gimbal;
a case supported by the stationary equipment; means rotatably supported by the case for rotation about roll and pitch axes, said roll and pitch axes being transverse each to the other and being in a common plane;
the first gimbal rotatably supported by the means rotatably supported by the case for rotation about an azimuth axis, the center of gravity of the first gimbal and the gyro means mounted thereto being displaced with respect to the common plane of the transverse pitch and roll axes, whereby said first gimbal and the gyro means are in pendulous arrangement relative to the means rotatably supported by the case;
means arranged with the means rotatably supported by the case and operable for locking said means to prevent rotation about the pitch and roll axes and for unlocking said means to permit said rotation;
said means being initially locked and then unlocked for a predetermined interval during which the sensitive axis of the pendulous arrangement is levelled, and thereafter locked to strap-down the gyro means with respect to the roll and pitch axes;

means for sequentially rotating the first gimbal about the azimuth axis to a plurality of headings with respect to an initial heading, whereby the gyro means mounted to the first gimbal senses earth's rate at all of said headings and provides corresponding signals;

means arranged with the gyro means for sensing residual tilts of the means rotatably supported by the case from geodetic level and for providing corresponding signals;

means arranged with the means rotatably supported by the case for sensing the angles of rotation of said means about the roll and pitch axes and for providing corresponding signals; and means connected to the gyro means, the residual tilt signal means and the angle of rotation signal means, and responsive to the signals therefrom for providing signals commensurate with the heading of the stationary equipment with respect to north, and with the attitude of the case with respect to geodetic level.

15. Apparatus as described by claim 14, wherein the means rotatably supported by the case for rotation about roll and pitch axes is characterized by:
   a second gimbal rotatably supported by the case for rotation about the roll axis; and
   a third gimbal rotatably supported by the second gimbal for rotation about the pitch axis.

16. Apparatus as described by claim 15, further characterized by:
   the first gimbal rotatably supported by the third gimbal for rotation about the azimuth axis.

* * * * *